United States Patent [19]

Pollard

[11] Patent Number: 4,860,786

[45] Date of Patent: Aug. 29, 1989

[54] SHUT OFF FOR A GAS LINE

[76] Inventor: Stephen L. Pollard, 27703 Ortega Hwy., Space 14, San Juan Capistrano, Calif. 92675

[21] Appl. No.: 93,133

[22] Filed: Sep. 3, 1987

Related U.S. Application Data

[63] Continuation-in-part of Ser. No. 20,128, Feb. 27, 1987, abandoned.

[51] Int. Cl.$^4$ .................. F16K 31/62; F16K 35/12
[52] U.S. Cl. .................... 137/384; 137/797; 251/90; 251/295; 251/296
[58] Field of Search ............ 137/384, 385, 797, 68.1; 251/293, 295, 296, 90, 101

[56] References Cited

U.S. PATENT DOCUMENTS

| 405,861 | 6/1889 | Wood | 251/295 X |
|---|---|---|---|
| 468,926 | 2/1892 | Bishop | 251/295 X |
| 527,327 | 10/1894 | Eldridge | 137/385 X |
| 1,004,446 | 9/1911 | Lundy | 137/384 X |
| 1,255,364 | 2/1918 | Waibel | 137/797 X |
| 1,291,566 | 1/1919 | Lewis | 137/384 X |
| 1,742,213 | 1/1930 | Murray | 137/384 X |
| 1,782,578 | 11/1930 | McCune | 251/295 X |
| 2,213,878 | 9/1940 | Boyle | 137/68.1 X |
| 2,693,716 | 11/1954 | Ludwig | 251/295 X |

FOREIGN PATENT DOCUMENTS 1053182 2/1954 France .......................... 251/296

Primary Examiner—Stephen M. Hepperle
Attorney, Agent, or Firm—Joseph E. Mueth

[57] ABSTRACT

The combination of a fluid conductive pipe line and an in-line valve adapted to open and close the fluid passage in said line, said valve having an external handle operatively connected to open and close the valve, said handle having an enlarged free end forming a foot pedal and being positioned such that the handle can be pivotally rotated to close said valve by foot or other pressure on said foot pedal.

4 Claims, 2 Drawing Sheets

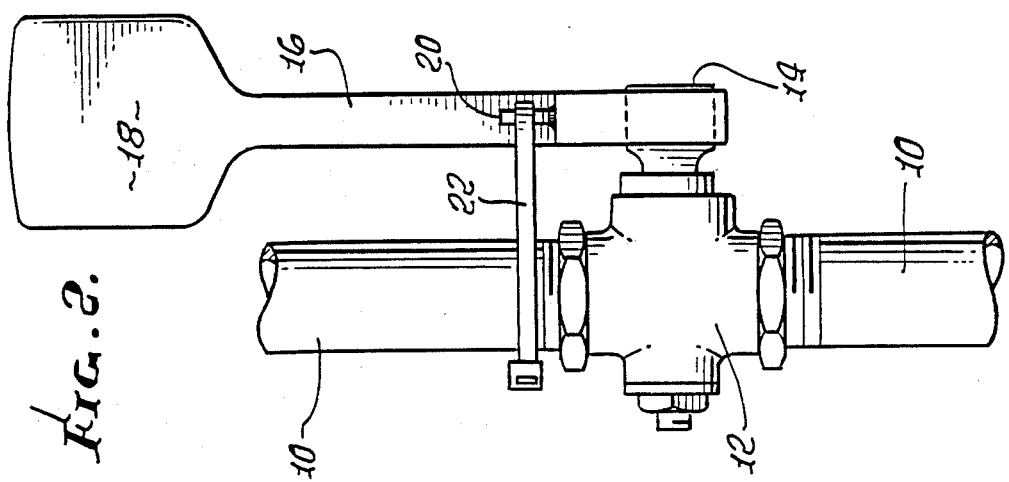
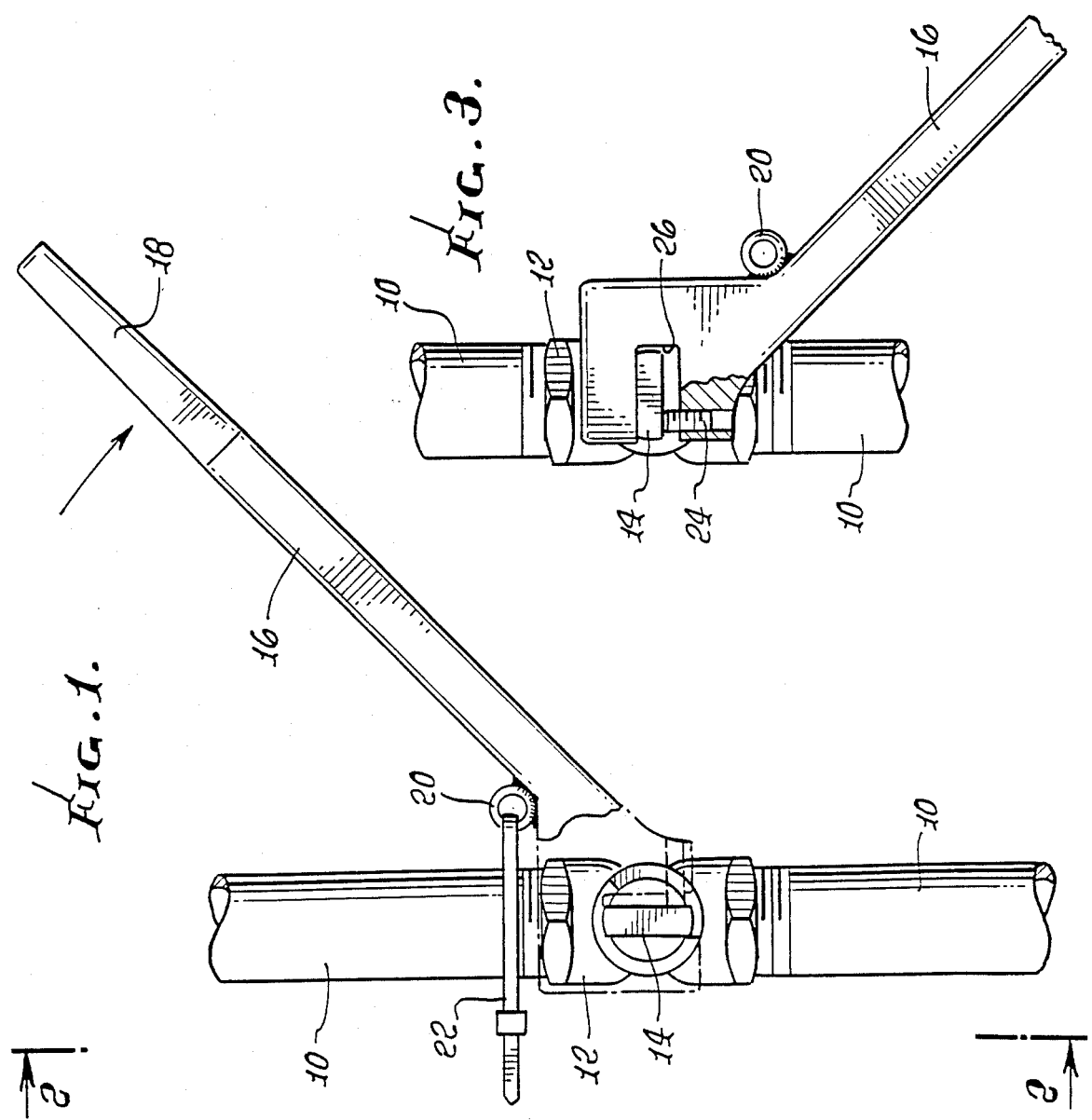

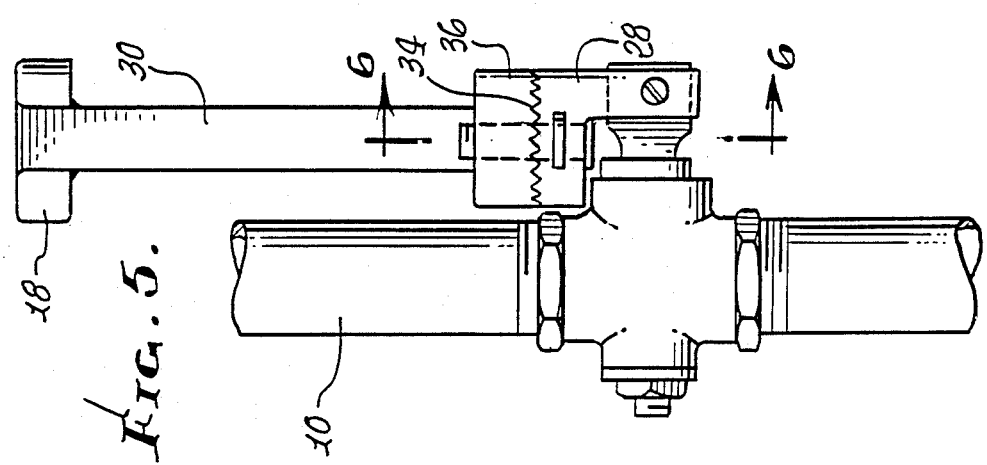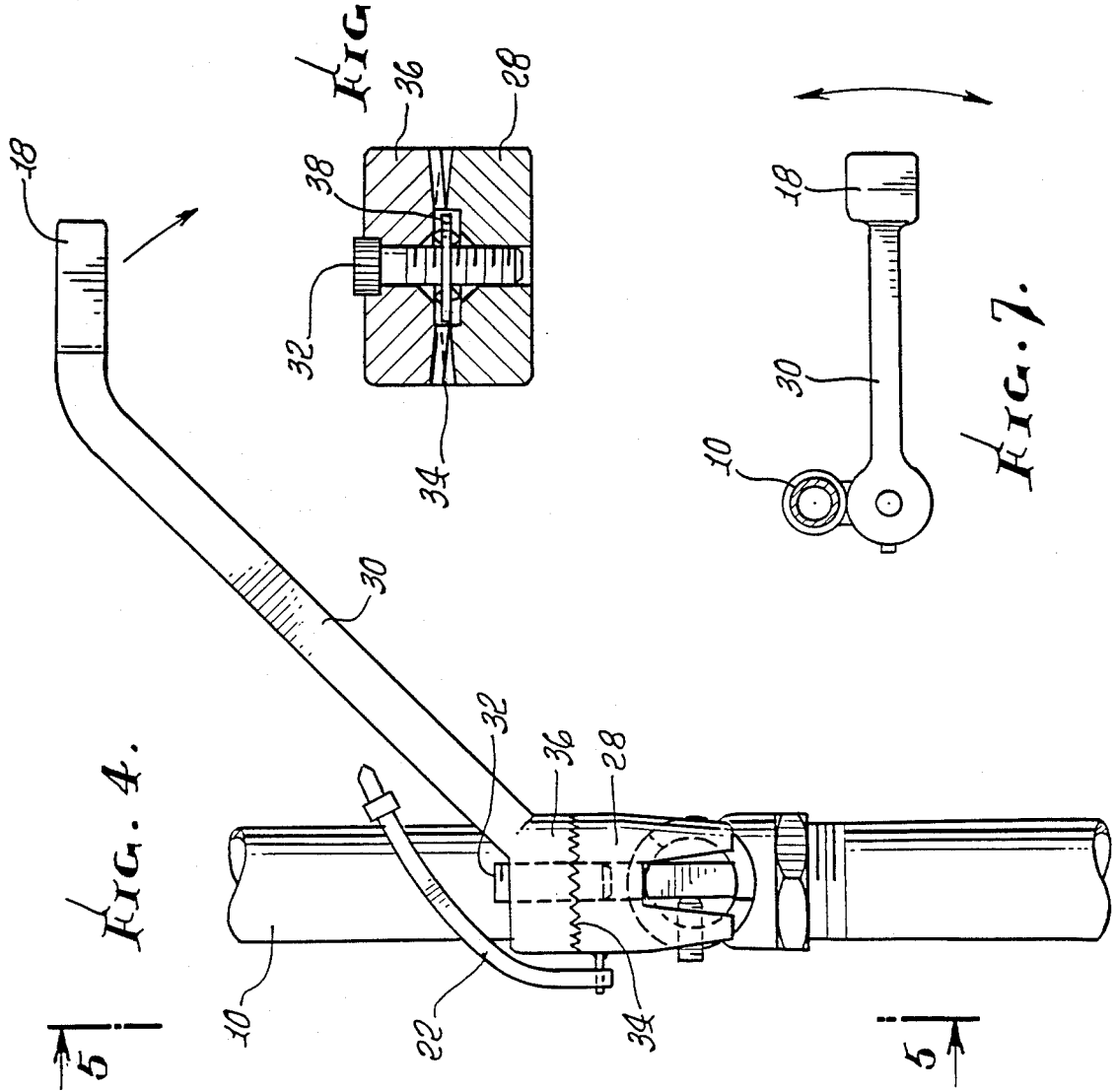

SHUT OFF FOR A GAS LINE

RELATED APPLICATION

This application is a continuation-in-part of U.S. Patent application Ser. No. 20,128, filed Feb. 27, 1987 now abandoned, the disclosure of which is incorporated herein by reference.

BACKGROUND OF THE INVENTION

Buildings of all types e.g., homes, schools, industrial buildings and the like, have gas lines which enter the building, usually at or near ground level. A broken gas line presents a substantial likelihood of a fire or explosion.

A broken gas line can occur in a variety of circumstances, earthquakes, landslides, cases of vandalism and terrorism, bombings, etc.

The present invention provides an important safety device which enables the ready, instantaneous closure of the gas line in the event of emergency or catastrophe. According to this invention, the gas line can be closed by the application of foot, hand or water pressure to a pedal, effecting instant closure.

It is to be expected that this invention will be widely adopted. This merit as a safety feature will likely result in its becoming a requirement as building codes are revised to take account of technological advances.

SUMMARY OF THE INVENTION

Briefly, the present invention comprises the combination of a fluid conductive pipe line and an in-line valve adapted to open and close the fluid passage in said line, said valve having an external handle operatively connected to open and close the valve, said handle having an enlarged free end forming a foot pedal and being positioned such that the handle can be pivotally rotated to close said valve by foot or other pressure on said foot pedal.

It is an object of this invention to provide a novel safety feature.

More particularly, it is an object of my invention to provide a novel means for the closure of a gas line in the event of rupture or failure in the line.

It is a related object of this invention to avoid and prevent fire and explosion in the event of a gas line breakage caused by natural or man-caused disturbances to the gas line.

In a preferred embodiment, it is an object of this invention to provide a novel valve closure means which is further provided with means to prevent accidental or inadvertent valve closure.

These and other objects and advantages of this invention will be apparent to those skilled in the art, particularly when taken in conjunction with the more detailed description which follows, and further with the accompanying drawings.

DESCRIPTION OF THE PREFERRED EMBODIMENTS

Turning to the drawings:

FIG. 1 shows a side plan view of the pipe line, valve and handle combination of this invention with the valve in the open position and the handle restrained against inadvertent closure.

FIG. 2 shows a top plan view of the apparatus of FIG. 1.

FIG. 3 differs from FIGS. 1 and 2 in that the handle has been pushed down, cutting the restraining element and closing the valve within the pipe line.

FIG. 4 is a side view of an alternate embodiment of this invention.

FIG. 5—5 is taken along the line 5—5 in FIG. 4.

FIG. 6 is an enlarged sectional view taken along line 6—6 in FIG. 5.

FIG. 7 is a top and partial sectional view of the elements shown in FIG. 4.

Considering the drawings in greater detail, the pipeline 10 is provided with a valve 12 of convention internal structure which is not shown since numerous internal or in line valve structures for opening and closing off fluid passage are already known in the art and the present invention is adapted to, and provides for, the improvement of the use of all such valves.

Typically, the valve has valve and a seat, the valve portion is adapted to raise off of the seat to allow fluid to pass, and to close tightly onto the seat to close off fluid passage.

The valve 12 has a shaft 14 which is adapted to be rotated. The internal portion of the shaft is operatively associated to bring the internal valve into and out of engagement with the valve seat. The external portion of shaft 14 in this invention has affixed, either permanently or removably by a screw or other fastening means, a handle 16 which is pivotally rotatable as shown by the arrow in FIG. 1 to rotate shaft 14 to open and close the internal valve. The free end of handle 16 has an enlarged pedal-like portion 18.

The upper surface of handle 16 has an eyelet 20 which preferably has a sharpened, cutting, knife-like inner finish. A loop 22 of a strong but severable material such as nylon cord passes through eyelet 20 and around pipe line 10, as shown in FIG. 1. The loop 22 thus prevents the accidental or inadvertent closure of the valve 12 by bumping or dropping of light loads onto pedal 18. However, in an emergency, when it is desired to close valve 12, closure can be accomplished by applying sufficient force to pedal 18 to close the internal edge of eyelet 20 to sever loop 22 while concurrently rotating the handle 16 downwardly as shown in FIG. 3, to close the valve.

The pressure intended to be applied to pedal 18 can be provided by foot pressure, viz, simply stepping on pedal 18. If a fire has already broken out, close approach to the valve may be impossible or dangerous in which case pressure to pedal 18 to sever loop 22 and close valve 12 can be provided by bringing water pressure from a fire hose to impinge directly onto pedal 18. Manual pressure or the application of hitting force using a large or heavy object will also accomplish closure.

In the embodiment of FIG. 3, the handle 16 is held in engagement with the free external end of shaft 14 by an "Allen screw" 24, and the handle 16 has a notch 26 which closely engaged and receives the exposed external end of shaft 14. Many other means for connecting the handle 16 to the shaft 14 are contemplated and are within the scope of my invention.

In the embodiment of FIGS. 4 to 7, the external handle is in two parts, a yoke portion 28 and the handle itself 30. The two piece construction permits the handle 30 to be set an any desired position with respect to yoke 28 as indicated by the arrow in FIG. 7. This is important in installations where there are interfering structures, walls, plumbing and the like which restrict the up and down movement of the handle 30 indicated by the arrow in FIG. 4. The installer simply rotates the handle on the yoke by movement indicated in FIG. 7 so that sufficient free space exists below the handle, then the screw 32 is set, causing the interlocking of the serated mating surfaces 34 in the top of the yoke 28 and the overlying disc portion 36 of handle 30. If desired, a star washer 38 can be used between mating surfaces 34, as indicated in FIG. 6, to further lock the yoke 28 to handle 30.

The foot pedal 18 in this embodiment is at an oblique angle to the main portion of handle 30.

The embodiment of FIGS. 4 to 7 otherwise operates as previously described.

Having fully described the invention, it is intended that it be limited solely by the lawful scope of the appended claims.

We claim:

1. The combination of a fluid conductive pipe line and an in-line valve adapted to open and close the fluid passage in said line, said valve having an external handle operatively connected to open and close the valve, said handle having an enlarged free end forming a foot pedal and being positioned such that the handle can be pivotally rotated to close said valve by foot or other pressure on said foot pedal, and said handle is restrained against inadvertent closure by a loop of material passing around said pipe line and the handle has an eyelet on its upper surface through which said loop also passes such that said handle cannot be moved from an open valve to a closed valve position without cutting said loop.

2. The apparatus of claim 1 wherein the inside of said eyelet is provided with a sharp cutting edge adopted to cut said loop, when pressure is applied to said handle to pivotally rotate said handle to close said valve.

3. The combination of claim 1 wherein the external handle is made of two parts, a yoke operatively connected to open and close the valve; and a handle portion, the yoke having an upper disk portion and the handle being adjustably rotatable about and fastenable to said disk portion to permit adequate free space for pivotal rotation of the handle to close the valve.

4. The combination of claim 1 further in combination with a structure and a gas burning device, said pipe line conducting gas into the interior of said structure and supplying gas to said gas burning device, said valve being adapted to be closed in the event of a natural or man-made calamity to cut-off the escapage of gas into the interior of said structure.

* * * * *